United States Patent [19]

Smirl et al.

[11] Patent Number: 4,848,508

[45] Date of Patent: Jul. 18, 1989

[54] METHOD AND APPARATUS FOR CONTROLLING WHEEL SLIP IN A FULL-TIME FOUR WHEEL DRIVE VEHICLE

[75] Inventors: Richard L. Smirl, Arlington Heights, Ill.; Mark J. Fogelberg, Muncie, Ind.

[73] Assignee: Borg-Warner Automotive, Inc., Troy, Mich.

[21] Appl. No.: 104,025

[22] Filed: Oct. 5, 1987

[51] Int. Cl.[4] .............................................. B60K 17/34
[52] U.S. Cl. .................................... 180/248; 180/248; 180/197
[58] Field of Search ....................... 180/248, 249, 197; 74/710.5, 711, 665 GA, 665 GE; 192/44, 45

[56] References Cited

U.S. PATENT DOCUMENTS

| | | | |
|---|---|---|---|
| 3,481,436 | 12/1969 | Wilkowski | 180/249 |
| 3,656,573 | 4/1972 | Halberg | 180/249 |
| 4,434,878 | 3/1984 | Okubo | 192/44 |

Primary Examiner—Charles A. Marmor
Assistant Examiner—Donn McGiehan
Attorney, Agent, or Firm—James A. Geppert; James J. Jennings; John W. Harbst

[57] ABSTRACT

A center differential offering a full-time two axle drive system. The center differential includes a planetary gear set defining a first drive path which provides an effective torque split ration to the front axle of the vehicle which is several percent less than the minimum dynamic weight ratio on the front axle assembly. The center differential further includes a bidirectional clutch mechanism defining a second drive path for connecting the driving input to the front drive axle assembly with a drive ratio several percent more than the rear axle ratio. The effective torque split and drive ratios are selected as a function of vehicle weight distribution and tire data for a specific vehicle so as to effect a controlled transfer of torque between the first and second drive paths and before the affected axle assembly reaches its traction limit in any mode of operation.

26 Claims, 3 Drawing Sheets

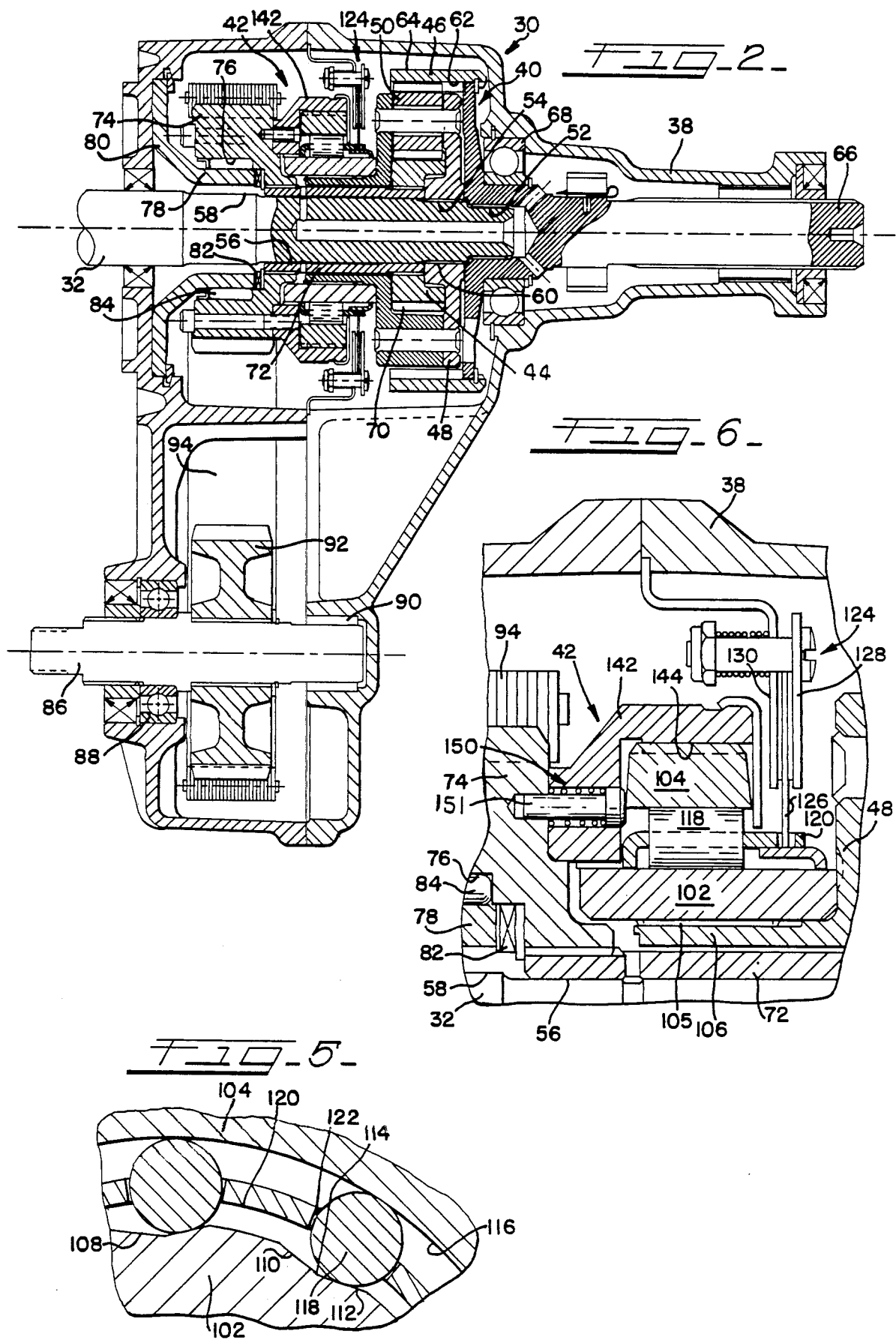

METHOD AND APPARATUS FOR CONTROLLING WHEEL SLIP IN A FULL-TIME FOUR WHEEL DRIVE VEHICLE

FIELD OF THE INVENTION

This invention relates to multiple drive axle vehicles, such as four wheel drive vehicles, and more particularly to a mechanism adapted to receive an input torque from a prime mover and to transmit a variable torque to a plurality of drive axles through a first or second drive path system.

BACKGROUND OF THE INVENTION

The art well recognizes that the tractive efforts of a vehicle are substantially improved if driving torque is applied to more than one axle. This concept underlies the employment of four wheel drive systems.

If all four wheels are positively driven by the engine, however, a severe amount of tire scraping or cornering scrub may occur as the vehicle negotiates curves or turns. Under such conditions, the front wheels must run through an arc of greater radius than that of the rear wheels, and, therefore, need to rotate faster than the rear wheels. The inherent problems such a condition creates are apparent to those skilled in the art.

One approach to solving the problems inherent in positive four wheel drive systems is to provide a manually operable jaw clutch between the drive axles thereof. The provision of a manually operable jaw clutch in the system allows disconnection of one axle from the power source. Vehicle's incorporating such manual jaw clutches are used as two wheel drive systems the vast majority of the time. As such, this system fails to provide the handling and performance benefits afforded by a full-time four wheel drive system.

Another approach to the provision of a four-wheel drive system involves the use of one or more one-way clutch mechanisms disposed between the front and rear wheel drive shafts. U.S. Pat. Nos. 4,018,317 and 4,054,065 are exemplary of such deives. These devices permit the vehicle to be transmuted from a two wheel to a four wheel drive in response to the rear drive axle overspinning or overrunning the front drive axle. In such devices, however, no provision was contemplated for full time four wheel drive. That is, these devices offer no provision for normally dividing the input torque between both drive axles under other than overspinning conditions.

Much effort has been devoted to another approach which is the provision of a center differential in a four wheel drive system. In a vehicle equipped with a center differential, the front and rear drive shafts would serve respectively to drive front and rear differentials, the shafts being powered from the engine through the center differential. Such a differential system permits overspeeding of any one or more of the wheels resulting from rounding corners or of certain wheels having a smaller effective radius than others.

Certain deficiencies, however, arise dur to the fixed torque split with this type of system. For instance, if one set of wheels should encounter a slippery or icy patch of ground and lose traction, they will spin and the differential action will cause the other set of wheels to lose driving torque. Manually operable locking means have been incorporated into such differential systems, which, when engaged, eliminate differential action between the drive shafts and positively lock the driven parts together.

Other drive systems have been proposed which combine a center differential with a clutch mechanism for imitating or simulating a four wheel drive system only when the vehicle is driven in a forward direction. One such system is shown in U.S. Pat. No. 3,627,072 issued to R. L. Smirl. The device disclosed in that patent, however, is not a full-time four wheel drive system. In fact, the device disclosed in the '072 patent allows only two of the four wheels to propel the vehicle when it is driven in a reverse direction.

Another known system has a center differential which provides an equal torque split to the front and rear drive axles of the vehicle. Instead of bevel gears, this system includes a multitude of crossed axis or worm gears to add mechanical friction. By such construction, some additional torque is transferred from the fastener to the slower turning drive axle in substantial proportion to the input torque. This system does not and cannot distinguish which axle is turning faster. Moreover, this system does not distinguish whether the difference in axle speeds results from wheel slip or by steering into a turn. Of course, when turning any additional torque transfer is detrimental to handling and can be unsafe on slippery surfaces.

A currently used system has a viscous clutch arranged in parallel with a center differential. This design uses approximately 50 or more plates in a sealed clutch housing nearly filled with a silcone fluid having a carefully selected viscosity. The clutch transfers torque from the faster to the slower turning axle in a manner roughly proportional to the speed difference between the axles. Such torque transfer is effected without distinction as to which axle may be turning faster. Moreover, such torque transfer is affected without regard to whether the speed difference is due to wheel slip or steering.

At lower axle speed differences (i.e., 2% due to tire variation), torque transfer through the viscous clutch unit slightly degrades vehicle handling and efficiency. Such degradation is usually noticable only on slippery roads.

When there is a medium level or degree of axle speed difference (i.e., 8 to 16% due to slip at one axle depending on surface conditions), torque transfer through the viscous clutch unit reaches a useful value. In this situation, the slipping wheels are at their traction limit. That is, nothing remains for lateral control of the vehicle. At this point uncontrolled wheel spin develops which results in rapid heating of the viscous clutch unit. Rapid heating of the viscous fluid reduces its viscosity and stresses the seals.

At higher axle speed differences (i.e., 20% due to turning a tight corner), torque transfer through the viscous clutch unit develops negative torque at the front axle and positive torque at the rear axle exceeding the traction limit if the vehicle is moving on ice (0.05 u) at a speed that would be safe for conventional drive (0.03 G lateral force). In this condition, no torque transfer between the drive axles is the safest even for friction based differentials, in two wheel drive vehicles.

As evidenced from a plethora of recently issued patents, more complicated externally controlled electronic systems are under development. The reaction time of such electronic systems is critical. That is, such systems must react in time to avoid breaking traction or imparting a shock load to the vehicle.

Thus, there remains a need for a simple full-time passively controlled mechanical system which allows any pair of wheels to freely overspeed or overrun the others by several percent while allowing the steerable wheels to freely overrun the other driven wheels by at least twenty percent. Moreover, such a full-time system should provide variable torque split to the front wheels ranging from under 30% to over 90%, as needed, without imparting a shock load to the drive line and before the drive wheels break traction with the road.

SUMMARY

The present invention meets this need by taking a unique approach to the design of a two axle drive mechanism adapted for use with a full-time four wheel drive vehicle. In designing this system, a high priority was assigned to vehicle handling and safety on slippery wet surfaces. Unlike other systems, an understanding of the present invention begins with the tire to road interface and involves an initial determination of the minimum dynamic weight ratio at the front axle at maximum vehicle thrust. Knowing this, a center differential is provided. The center differential includes a gear set having an input member drivably connected to two output members. A salient feature of the present invention is an appreciation that the center differential should have an initial effective torque split ratio to the front axle which is several percent less than the minimum dynamic weight ratio initially calculated. As such, the differential can induce an overrun ratio which would cause rear wheel slip which is several percent more than front wheel slip. The next step in the design process involves calculating the traction coefficient for the front and rear pairs of road wheels. Using specific data plots ($\mu$ curves) of known traction coefficients versus wheel slip for wet roads, the next step involves determining the difference in wheel slip between the front and rear pairs of road wheels at maximum thrust on wet roads. Having determined the difference in wheel slip, the output members of the differential may be connected to the drive axles such that the output member connected to the front, steerable wheels overruns the other output member by an amount determined from the specific data used to determine wheel slip. The next step involves the capability of transferring torque through a second torque transfer path before the vector combination of horizontal forces exceeds the traction limit at the affected axle. That is, excess torque should be transferred before the wheels lose traction with the road and without imparting a shock load to the vehicle.

Having once achieved an appreciation of the above considerations, a two axle drive mechanism capable of achieving those results was invented. The two axle drive mechanism includes a center differential having an input member and two output members driven by that input member. In its preferred form, the center differential comprises a planetary gear set arrangement. Each of the output members of the differential is connectable to a drive axle of the vehicle. The proposed center differential defines a first torque transfer path having a predetermined initial effective torque split to the front axle which is several percent less than the minimum dynamic weight ratio on the front axle. The initial torque split is selected for the specific weight distribution of the vehicle to assure that rear wheel slip slightly exceeds front wheel slip. The output members are connectable to the drive axles of the vehicle such that the output member associated with the front drive axle normally overruns the other output member by a predetermined several percent when both axles are turning at the same speed.

The present invention also includes a clutch mechanism arranged in parallel with the differential for connecting any two of the differential members in a manner permitting overrun of the output associated with the front drive axle member relative to the other output member in both forward and reverse vehicle directions. In its presently preferred form, the clutch mechanism comprises an overrunning clutch having a drive member, a driven member, and a series of rollers therebetween. The driven member normally overruns the driving member by a predetermined several percent established through the manner by which the output members are connected to their respective drive axles. The clutch mechanism instantaneously engages when the first member ceases to overrun the other output member. When engaged, the clutch mechanism defines a second torque transfer path for transferring excess driving or braking torque from one drive axle to the other before the affected axle reaches its traction limit.

The driven member of the clutch mechanism may be operably connected to the front drive axle through a lost motion mechanism. The lost motion mechanism permits angular displacement of the output drive shaft connected to the front axle relative to the output member of the center differential connected thereto. The amount of angular displacement or free travel will be somewhat greater than the total backlash plus wind-up (torsional deflection) of the entire front axle driveline at full torque. The lost motion mechanism prevents inadvertent operation of the clutch mechanism and permits the transmission to be shifted between forward and reverse without closing the engine throttle and bringing the vehicle to a full stop.

Accordingly, a primary object of this invention is the provision of a full-time two axle drive mechanism which allows a vehicle substantially the same levels of acceleration and safety on slippery wet roads as single axle drives offer on dry roads.

Another object of this invention is the provision of a self contained, passively controlled two axle drive mechanism which can provide a stepless or variable torque split to the front axle of a vehicle. The torque split can range from under thirty percent (30%) when the front road wheels are on ice to over ninety percent (90%) when the rear wheels are on ice. This torque split can be affected in both vehicle directions and without resistance to the front wheels overrunning the rear wheels because the vehicle is in a turn.

Another object of this invention is the provision of a two axle drive mechanism having a first torque transfer path effecting a predetermined initial torque split of input torque in a manner assuring that rear wheel slip slightly exceeds front wheel slip and which further includes a second torque transfer path for transferring excess driving torque from one drive axle to the other drive axle before the former reaches its traction limit in vector combinations of forward and lateral forces.

BRIEF DESCRIPTION OF THE DRAWINGS

Having in mind the above objects and other attendant advantages that would be evident from an understanding of this disclosure, the invention comprises the devices, combination and arrangement of parts as illustrated in the presently preferred form of the invention which is hereinafter set forth in detail to enable those skilled in the art to readily understand the function, operation, construction and advantages of same when read in conjunction with the accompanying drawings in which;

FIG. 2 is a sectional view of an apparatus incorporating the teachings of the present invention;

FIG. 5 is a fragmentary enlarged view of a portion of the clutch forming part of the present invention;

FIG. 6 is an enlarged view of the drag spring arrangement used in combination with the present invention.

DETAILED DESCRIPTION OF THE PREFERRED EMBODIMENT

Figure 1:
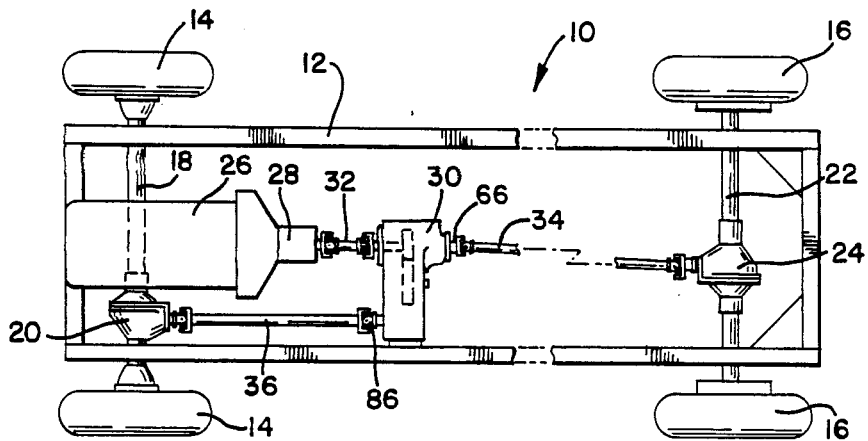
FIG. 1 is a schematic top plan view of a vehicle incorporating the apparatus of the present invention.

Referring now to the drawings, wherein like reference numerals indicate like parts throughout the several views, the apparatus of the present invention, as illustrated in FIG. 1, may be used in combination with a four wheel drive vehicle 10. The vehicle 10 includes a chassis or frame 12 to which are mounted front and rear pairs of road or traction wheels 14, 16, respectively. A front drive axle assembly 18 including a front differential 20 mounts the front pair of road wheels 14 to the frame. The front drive axle 18 is mounted to the frame 12 in a manner permitting steering control of wheels 14 by a steering mechanism (not shown). A rear drive axle assembly 22 including a rear differential 24 mounts the rear pair of road wheels 16 to the frame. The vehicle 10 further includes a power train comprised of a prime mover or engine 26, a transmission 28 and a two axle drive mechanism 30 for concomitantly driving both the front and rear pairs of wheels. The transmission 28 is conditionable to move the vehicle in either forward or reverse directions. The mechanism 30 is connectable to an output drive shaft 32 extending from the transmission 28. Mechanism 30 is adapted to transmit or transfer torque in a predetermined manner to output shafts 34 and 36. The rearwardly extending output shaft 34 extends from drive 30 to the rear differential 24 to transmit rotary power and torque to the rear drive axle assembly 22 and ultimately, to the rear wheels 16. The forwardly extending output shaft 36 extends from drive 30 to the front differential 20 to transmit rotary power and torque to the front drive axle assembly 18 and, ultimately, to the front wheels 14. With the exception of drive unit 30, the purpose and operation of the other parts of the vehicle are well known and, thus, no further details need be provided therefor.

A preferred embodiment of the two axle drive mechanism for a longitudinally disposed power train arrangement is illustrated in FIG. 2. A two axle drive mechanism for a transverse power train looks quite different. In its illustrated form, the components of the mechanism 30 are housed in a substantially fluid tight casing or housing 38. The mechanism 30 comprises, generally, a differential gear set 40 defining a first torque transfer path for dividing torque in a predetermined manner to each pair of driven road wheels and operative means 42, responsive to either forward or reverse directions of travel of the vehicle, defining a second path through which torque may be transferred from the rear wheels to the front wheels. In its preferred form, the differential gear set includes a planetary gear arrangement which is operative to bias torque between an input member and two output members all of which are coupled in a predetermined drive relationship. For purposes of this disclosure, however, the terms "differential" and "differential unit" mean a mechanical connection which divides the torque between the front and rear wheels at a ratio selected as a function of vehicle characteristics.

The presently preferred differential comprises a planetary gear set 40 including at least three revolubly mounted elements or members which are coupled in a predetermined relationship to each other and which can be driven in either forward or reverse directions. More specifically, the planetary gear set includes a sun gear element 44, an annulus or ring gear element 46, and a planet carrier 48 carrying a series of planet gears 50, only one of which is shown in FIG. 2. Each planet gear 50 intermeshs with both the sun and ring gear elements 44 and 46, respectively. The gear arrangement is designed to establish an effective torque split to the front axle of the vehicle which is several percent less than the minimum dynamic weight ratio on the front axle.

The input drive shaft 32 extending from the transmission is coaxially positioned with the differential gear set 40. In the preferred embodiment, the planet carrier 48 has a spline connection 60 with a step portion 54 on shaft 32. As such, the planet carrier 48 and planet gears 50 driven thereby serve as an input drive member for the differential gear set. That is, the planetary gears 50 arranged on the planet carrier 48 drive the sun gear and ring gear elements 44 and 46, respectively; the latter two elements serving as output members for the differential gear set. The gear teeth on the ring gear element 46 are internally formed on the inner surface of a cylindrical portion 62 of a cup shaped member 64 having an integrally formed stem portion defining an output shaft or member 66 and a part of which is rotatably supported in the housing 38 by a bearing 68. As seen in FIG. 1, the output shaft 66 may be drivingly connected to the rear pair of road wheels 16 by the rear output shaft 34, rear differential 24, and rear drive axle assembly 22.

Returning to FIG. 2, the sun gear element 44 of the gear set 40 is of multipiece construction. That is, the sun gear element 44 comprises a first gear section 70 disposed in driving engagement with the planetary gears 50, a sleeve section 72 spline connected at one end to the first gear section 70 and telescopically arranged about a step portion 56 on shaft 32 but revolubly mounted relative thereto, and a second gear section 74 spline connected to the other end of sleeve section 72. This second gear section 74 includes an axially orientated annular recess 76 arranged to overlay a reduced end portion 78 of a funnel shaped thrust member 80 secured to housing 38. Suitable bearing means 82 and 84 may be disposed between thrust member 80 and the second gear section 74 to support and thrust the latter for rotation about the axis of shaft 32.

The sun gear element 44 is drivingly connectable to the front axle. Different forms of driving connections between the output element 44 and the front axle may be provided depending on engine disposition and other factors. The form of driving connection is not important or critical to the invention. What is important is that the output members of the gear set be connected to their respective drive axles such that a speed differentiation is created between the output members of the gear set. More specifically, the output element 44 should be connected such that it overspeeds or overruns the other output element by a predetermined several percent when the front and rear pair of road wheels are turning at the same speed. In the embodiment illustrated in FIG. 2, an output shaft 86 is spaced laterally from and parallel to the output shaft 66 and is rotatably supported in a lower end of housing 38 by bearings 88 and 90. As seen in FIG. 1, the forward end of shaft 86 is drivingly connected to the front pair of road wheels 10 through the front output shaft 36, front differential 20, and the front drive axle assembly 18 so as to concomitantly drive the front wheels 14 with the rear wheels 16. Returning to FIG. 2, an annular hub member 92 is splined to the output shaft 86 for rotation therewith. The hub member 92 on output shaft 86 and the second gear section 74 of sun gear element 44 are connected by a force transfer means 94 in the form of a drive chain. In this embodiment, the second gear section 74, hub member 92, and force transfer means 94 define the driving connection which provides for normal overspeeding of the sun gear element 44 relative to the output member. Because the elements of the gear set are intermeshable with one another when the front and rear wheels 14, 16 of the vehicle are turning at the same speed, the sun gear element 44 is rotated at a predetermined several percent more than the rotation of the other output element 64 of the gear set.

Figure 3:
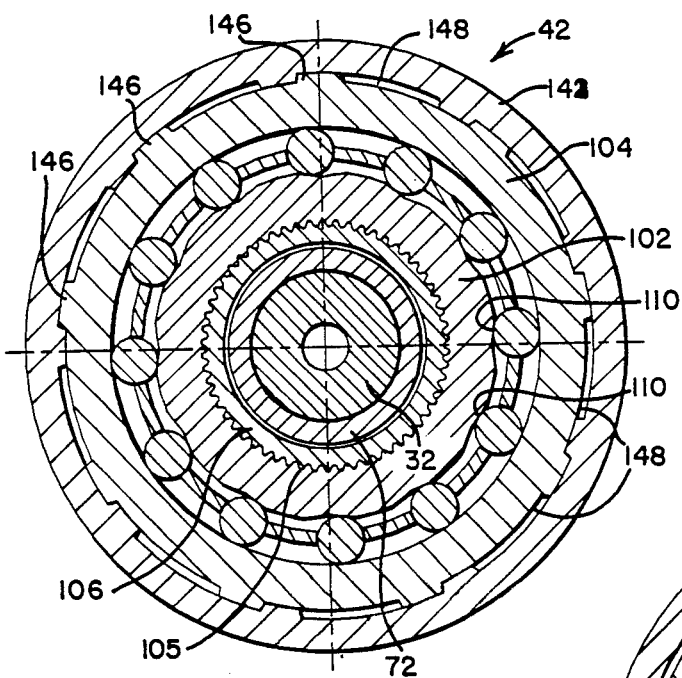
FIG. 3 is an end view of the clutch incorporated for use with the present invention.
Figure 4:
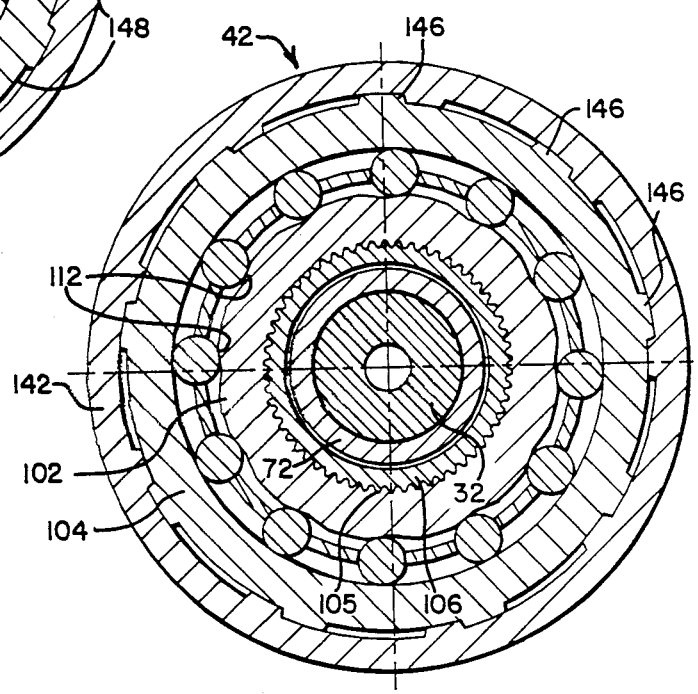
FIG. 4 is an end view similar to FIG. 3.

Another salient feature of the present invention is the provision of operative driving means 42 defining a second drive path for transferring torque between the output members of the gear set when the speed differentiation therebetween ceases. As best seen in FIGS. 3, 4 and 6, the driving means 42 includes a bidirectional overrunning clutch having concentrically arranged first and second races 102 and 104, respectively. The first or drive race 102 has a spline connection 105 with a cylindrical sleeve extension 106 provided on the pinion carrier 48. As such, the drive race turns with the pinion carrier regardless of its direction of movement and, thus, allows the bidirectional clutch mechanism 42 to respond to rotation of the input drive member of the gear set. Turning now to FIG. 5, the first or drive race element 102 comprises an external surface having a plurality of cam surfaces 108 thereon. In the preferred embodiment, each cam surface 108 is provided with oppositely directed ramp sections 110 and 112 with a center section or portion 114 (FIG. 5) disposed therebetween. It is within the scope of this invention, however, to design the cam surface 108 as a tangential flat on the periphery of race 102. The second or driven race 104 is drivingly connected to turn with the sun gear element and has an internal cylindrical race surface 116. The interior cylindrical surface 116 of the outer race 104 and the outer cam surface 108 of drive member 102 define an angular space therebetween which is occupied by a series of rollers 118 arranged for movement between an engaged or driven position and disengaged or free running position. The position of the rollers 118 when the vehicle is driven in reverse is illustrated in FIG. 3. The position of the wedging elements when the vehicle is driven in a forward mode is illustrated in FIG. 4. In the preferred embodiment, the roller clutch elements are mounted in a roller cage 120. The cage or element 120 has a plurality of openings 122 generally corresponding to the dimensions of the rollers 118 to accurately space the rollers 118 during operation of the device.

Turning now to FIG. 6, arranged in combination with the roller cage 120 is a friction drag mechanism 124. In its preferred form, the drag spring mechanism 124 includes a friction plate 126 which projects radially outward from its drive connection with the roller cage 120. The outer portion or free end of the plate 126 is interposed between two spring biased pressure plates 128 and 130 grounded to the housing 38. This combination provides a frictional drag to the roller cage 120, which maintains the clutch mechanism in an energized state in both directions of rotation. Alternatively, the cage 120 may be carried by the slower turning ring gear element 64. In whatever form it assumes, the purpose of mechanism 124 is to maintain the rollers 118 in driving contact with the inner race to allow for instantaneous clutch engagement. The pressure plates need to apply only a small fraction of a foot pound of friction drag to the plate 126. Other arrangements having cam surface 108 on the outer race would require much more drag.

Still another salient feature of the present invention is the provision of a lost motion mechanism which permits angular displacement of the front drive line components relative to the driven race associated therewith. Turning again to FIG. 6, an extension 142 is provided in combination with the second gear section 74 of the sun gear element 44. The extension 142 is provided with an annular recessed area 144. The driven race 104 of the bidirectional clutch mechanism 42 is accommodated within the recess 144. The radial contact areas on race 104 are relieved to minimize cold viscous friction. As best illustrated in FIGS. 3 and 4, the driven race 104 has a plurality of radially extending projections or teeth 146 which extend into circumferentially elongated slots or recesses 148 provided on extension 142. The circumferential length of each slot 148 is greater than the width of each tooth associated therewith. That is, the lash provided for by the lost motion mechanism must equal or exceed the total lash in the entire front drive line plus its "wind-up" or torsional deflection at full torque. By such construction, the front output shaft 86, drivingly associated with the driven race 104, has a considerable degree of free angular displacement when shaft 32 forcibly reverses direction.

An anti-rattle mechanism 150 may be provided in combination with the clutch mechanism for torsionally rough power trains. Such a mechanism may include a resiliently biased plunger 151 which lightly acts against the outer race 104 to limit the minimum hot friction between race 104 and recessed area 144. The total mechanical and viscous friction should not exceed one fourth the amount of friction applied to disc 126 by the drag spring mechanism 124.

An illustrative example may further explain the uniqueness of the instant invention. For purposes of this description, a vehicle having the following characteristics may be used: 105" wheel base; a curb weight of 3330 lbs.; a 21.75" center of gravity height with tires having 12" rolling radius; a front longitudinally disposed engine capable of producing 220 foot lbs. of torque and 165 horsepower at 4200 engine RPM's; and, a 13.54/1 overall low ratio with performance ratio axles. With rear biased loading, the minimum static weight ratio on the front axle is 54%.

As mentioned above, and unlike other systems, the method for determining design parameters of the drive mechanism 30 involves an initial calculation of the maximum thrust developed by the vehicle. With the above example, the maximum thrust developed by the vehicle approximately equals 2800 lbs. Next, the dynamic weight transfer is calculated. With the above example, this approximately equals −580 lbs. at the front axle and +580 lbs. at the rear axle. The next step in the process is to determine the static and dynamic axle loads and minimum dynamic weight ratio. With the above example, the axle loads and dynamic weight ratio calculate as follows:

| Axle Load: | Front, F | Rear, R | Total, T | Ratio, F/T |
|---|---|---|---|---|
| Empty | 2030 lbs. | 1300 lbs. | 3330 | 61% |
| Loaded | 2220 lbs. | 1880 lbs. | 4100 | 54% (Min.) |
| Dynamic | 1640 lbs. | 2460 lbs. | 4100 | 40% (Min.) |

The next step in the process is to select the initial torque split to the front drive axle. Preferably, the initial torque split to the front drive axle should be a few percent less than the minimum dynamic weight ratio on the front axle. In this embodiment, 36% has tentatively been chosen. The next step in the process involves a calculation of axle thrusts for 2800 lbs. of total thrust. Given the above, the front thrust approximately equals 1008 lbs. and the rear thrust approximately equals 1792 lbs. Then, it is necessary to calculate the traction coefficients or $\mu$. As known: $\mu$=thrust/load. With this example, the traction coefficient for the front wheels approximately equals $0.61\mu$ and the traction coefficient for the rear wheels approximately equals $0.728\mu$.

Using specific data plots ($\mu$ curves) of known traction coefficient versus wheel slip the next step involves determining the difference in wheel slip between the front and rear pair of road wheels at maximum thrust for essentially straight line acceleration on smooth, wet roads. This is effected by plotting the traction coefficient for the front and rear wheels on a $\mu$ curve similar to Curve A shown in FIG. 7. Curve A illustrates the effect of a tire on a smooth, wet pavement at a velocity of 20 ft/sec. with allowance for incidental steering inputs during essentially straight line acceleration. By plotting the traction coefficients, it is possible to determine the wheel slip of the front and rear wheels. As is apparent from Curve A in FIG. 7, the front wheel slip at $0.61\mu$ equals approximately 3.6% and the slip at the rear wheels at $0.728\mu$ equals approximately 6.8%. The tentative initial torque split is appropriate so far in that both of these points are well below the traction limit (TL) in the zone often called "creep" or controlled slip. It is now possible to determine the rear wheel overrun $\Delta P$ and the overrun ratio $(1 + \Delta P)/1$. In the example illustrated, the induced rear wheel overrun equals 3.2% (6.8−3.6%) and the induced rear overrun ratio equals 1.032/1. As will be understood, the normal front overrun ratio is selected to equal the induced overrun imparted to the second output member 66 of the gear set 40. This selection determines the transition point (T.P. on Curve A) whereat the clutch mechanism smoothly engages to transfer torque through the second torque transfer path well before the rear wheels reach their traction limit on wet pavement. This is accomplished by making a normal overrun of the output member associated with the front drive axle equal to 1.032/1. In this manner, the normal overrun ceases and the clutch mechanism 42 engages. Upon clutch engagement, the difference in wheel slip between the front and rear axles is maintained constant by the clutch mechanism and the wheel slip is determined by the $\mu$ curves. Whereas, in the first mode of operation, the initial torque split is maintained by the gear set and the difference in wheel slip was determined by the $\mu$ curves. In both modes of operation, the tire to road interface data provides the essential information. Given that engagement of the clutch mechanism will maintain a constant wheel slip difference in the second mode of operation, it is then possible to plot the limiting safe $\mu$ values available for other driving conditions.

Figure 7:
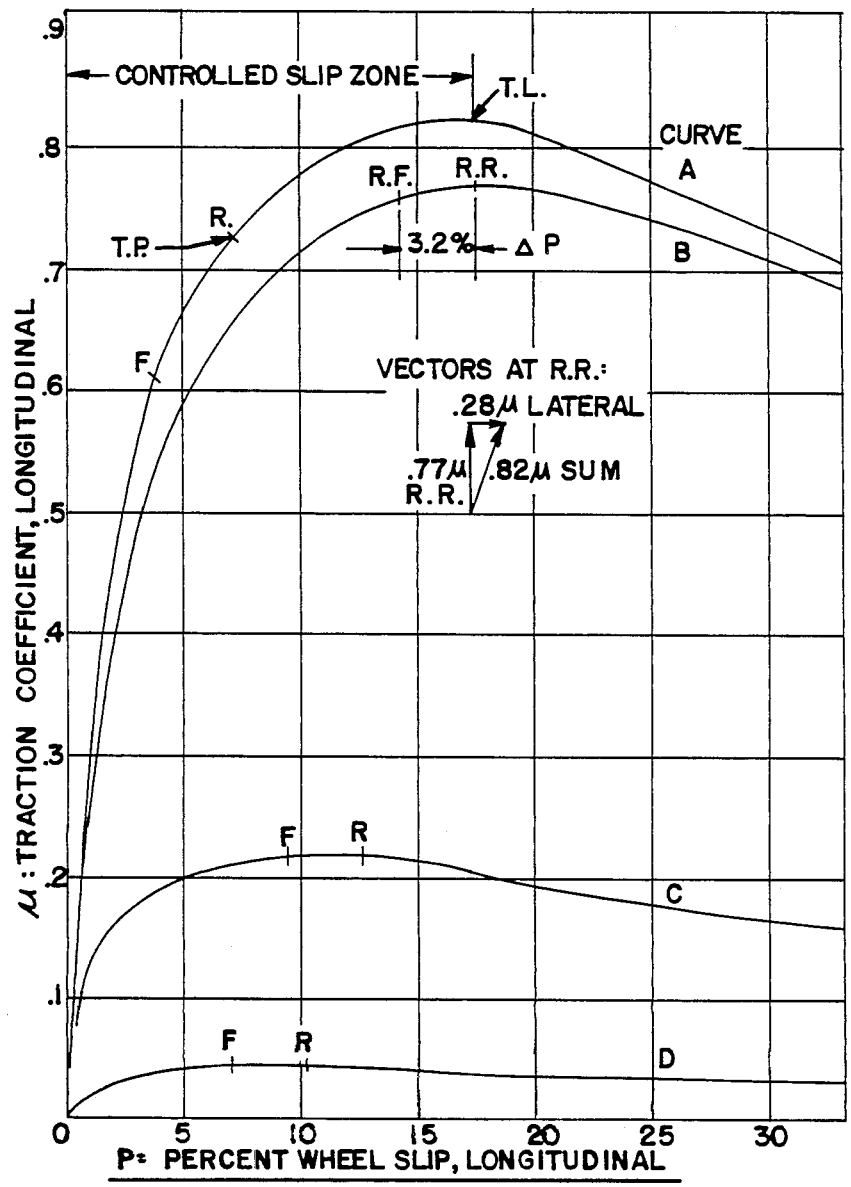
FIGS. 7 illustrates plots of traction characteristics of a specific tire on several surfaces - plot B includes the effects of a vehicle's lateral forces in a curve.

Curve B illustrated in FIG. 7 illustrates the same wet road conditions as Curve A but includes the effect of lateral force factors while accelerating through specific right hand curve from a full stop. Only points representative of the right hand wheels are shown as they are the limiting wheels. Curve C illustrates the effect of straight line acceleration of the wheels on 2" of packed snow at 0° F. Curve D illustrates straight line acceleration on glare ice at 32° F. ambient temperature.

Having selected the design parameters, the next step is to determine the specifications for the drive mechanism 30. With a power train arrangement as that shown in FIG. 2, a drop box design allows the front output shaft to be aligned with the front axle gearing. To accomplish a 1.032/1 normal overrun of the first or front output member of the gear set, the driven and drive sprocket 92 and 74, respectfully, are provided with an unequal number of teeth.. By such construction, a 1.0323/1 overrun ratio is accomplished at equal wheel speeds for identical axle ratios. It should be appreciated that other power train arrangements may require different arrangements within the drive mechanism for effecting an overrun of one output member relative to the other. It is also possible to select a planetary gear arrangement for the center differential having an overall or effective initial split to the front axle of 36% including the normal overrun ratio. As will be appreciated, the selection of the planet set may be suitable for other vehicles having reasonably similar dynamic weight distributions. That is, simple planet sets may provide overall splits of 30 to 40% for a wide range of vehicles. For very unusual vehicles, a planet set having dual planets with input to the ring gear and the second output from the planet carrier may be used to obtain overall splits in the 39 to 49% range. Moreover, a conventional bevelled gear set could be used for a 50/50 net split.

As mentioned, the preselected normal overrun ratio of the front output member relative to the rear output member creates a rotational speed difference between the driven and drive races, 102 and 104, respectively, and determines the transition point whereat torque transfer is transmitted from one drive path to the other drive path. While the driven race 104 normally overruns the pinion carrier 48, mechanism 124 maintains the rollers 118 in an engerized position whereat they are disposed for immediate engagement but the overrunning outer race delays the engagement. As will be appreciated, the overrunning incorporated into the design of the present mechanism permits the vehicle to negotiate any turn without engaging the clutch mechanism 42. Therefore, input torque delivered to the drive mechanism is normally biased to the front and rear pair of road wheels through the first drive path defined by gear set 40.

When the wheel slip difference between the front and rear pairs of road wheels causes the normal overrun between the front and rear output members of the gear set to cease, torque transfer is controlled through the second drive path as a function of clutch mechanism 42 engagement. That is, once the rear wheels rotate a predetermined amount faster than the front wheels, the transition point for the transfer mechanism is reached whereat the means for biasing torque to the wheels 14, 16 is transferred from the first drive path to the second drive path. As such, the drive mechanism of the present invention automatically and instantaneously distributes torque to the front drive axles to provide for optimum propelling force for the vehicle.

When the rear wheels return to the same or slower speed than the front wheels, driven race 104 will again overrun drive race 102. As such, torque will again be automatically biased between the output members of the drive means in the predetermined ratio or manner set by the gear set defining the first drive path.

As will be appreciated, the particular transition point where a torque transfer is shifted between the first and second drive paths may vary between vehicles. By using specific vehicle data and tire data it is possible, however, to optimize the effective torque split ratio of the gear set and normal overrun of the gear set members to optimize available thrust when the transition point is reached. In any event, the object is to choose a transition point for torque transfer well below the traction limit which allows some reserve for lateral or steering input of the vehicle on wet pavement.

It should be noted, due to its construction, the clutch mechanism 42 is effective to transfer torque whether the input drive 32 is rotating in either forward or reverse directions. As seen in comparisons of FIGS. 3 and 4, when the input to the transfer mechanism is driven in one direction, each ramp section 110 on cam surface 108 is effective to maintain roller 118 in driving contact with the drive race 104 to transfer torque through the second drive path. When the input to the transfer mechanism is driven in the opposite direction, each ramp section 112 on cam surface 108 is effective to maintain the rollers 118 in driving contact with the driven race 104 to transfer torque through the clutch mechanism. As may be readily appreciated, the clutch mechanism provides a smoothly applied automatic apparatus for transferring excess driving torque from the rear axle to the front axle before the rear axle reaches its traction limit in vector combinations of forward and lateral forces. As a consequence of its construction, the second torque transfer path is also capable of transferring excess braking torque from the front (when the front wheels rotate several percent slower than the rear wheels) to the rear axle before the front axle reaches its braking limit.

The various couplings, shafts and gearing disposed intermediate the output drive members of the transfer mechanism and the drive wheels inherently introduce slack or backlash and torsional deflection into the drive line. This slack or backlash can cause operational problems for the clutch mechanism. That is, when shifting the input drive direction of the drive mechanism between forward and reverse, the drive race 102 faithfully shifts relative to the roller cage 120 to accommodate the new direction. Because of the above mentioned deflection and backlash inherent in the system, however, the driven race 104 may continue to rotate in the previous direction.

The lost motion mechanism arranged in combination with the clutch 42 provides a solution to such operational problems. The lost motion mechanism allows angular displacement between the driven race 104 and the output member which turns therewith to prevent inadvertent clutch operation and permits the transmission to be shifted between forward and reverse without closing the engine throttle and bringing the vehicle to a full stop. The friction applied by anti-rattle mechanism 150 is well below that of the friction applied by mechanism 124 to the roller cage 120. Moreover, since the lost motion mechanism is arranged in parallel with the gear set 40, it is not felt as an additional drive line backlash.

When installed in a vehicle, the mechanism of the present invention offers a self contained, passively controlled two axle drive mechanism which can provide a stepless or variable torque split to the front axle of the vehicle. The two axle drive mechanism includes a center differential having an input member and two output members driven by that input member to define a first torque transfer path having an effective torque split ratio to the front axle of the vehicle which is several percent less than the minimum dynamic weight ratio on the front axle assembly. The predetermined initial torque split effected by the first torque transfer path assures that the rear wheel slip slightly exceeds front wheel slip. The drive mechanism of the present invention further includes a second torque transfer path for transferring excess driving torque from one drive axle to another drive axle before the former reaches its traction limit in vector combinations of forward and lateral forces. With the present invention, it is possible to effect a controlled transfer of torque through more than one drive path and in a manner stabilizing vehicle attitude in power-on curves and during panic braking.

Thus, there has been provided a Method And Apparatus For Controlling Wheel Slip In a Full Time Four Wheel Drive Vehicle which fully satisfies the aims, objectives, and advantages set forth above. While the invention has been described in connection with a specific embodiment thereof, it is evident that many alternatives, modifications and variations will be apparent to those skilled in the art in light of the foregoing description. Accordingly, it is intended to embrace all such alternatives, modifications, and variations as fall within the spirit and broad scope of the appended claims.

Thus, having adequately described our invention what we claim is:

1. A two axle drive mechanism for a full-time four wheel drive vehicle having front and rear pairs of driven road wheels, comprising:

a center differential including a driving input member and two driven output members defining a first torque transfer path for dividing torque in a predetermined manner to each pair of driven road wheels;

means associated with the differential to provide a speed differentiation between said driven output members by a predetermined several percent when the road wheels are turning at substantially the same speed; and clutch means connected between one output member and either the input member or the other output member in a manner permitting said speed differentiation between said driven output members and which is immediately engageable when said differentiation ceases in a manner defining a second torque transfer path for transferring driving torque between the road wheels without imparting shock loading to the vehicle, said clutch means being responsive to rotation of said input member when said differentiation ceases.

2. The two axle drive mechanism of claim 1 wherein said three members of the differential are arranged in a planetary gear arrangement and include a sun gear element, a ring gear element, and a series of planetary gears arranged in meshing engagement with said sun and ring gear elements in association with a carrier member.

3. The two axle drive mechanism of claim 2 wherein said planetary gears are operably connectable to an input drive shaft, and said ring and sun gear elements are each connectable to an output drive shaft.

4. The two axle drive mechanism of claim 1 wherein said clutch means is an overrunning clutch including a drive race, a driven race, and a plurality of wedging elements mountable between said races.

5. The two axle drive mechanism of claim 4 wherein said clutch means further includes a cage for supporting said wedging elements between said races, said wedging elements being movable between engaging and disengaging positions, and means for exerting a frictional force to said wedging elements.

6. The two axle drive mechanism according to claim 5 wherein said frictional force means includes a friction plate operatively connected to said cage, and an encompassing pair of plates connected to a stationary portion of said differential.

7. The two axle drive mechanism of claim 4 wherein said drive race comprises an external cam member having a plurality of cam surfaces thereon.

8. The two axle drive mechanism of claim 7 wherein each cam surface includes at least two ramp sections and a center section disposed intermediate said ramp sections.

9. The two axle drive mechanism of claim 4 wherein said driven race includes an internal cylindrical surface disposed for engagement with said wedging elements.

10. A two axle drive mechanism for a vehicle having front and rear pairs of driven road wheels, comprising:
a center differential including a driving input member and two driven output members defining a first torque transfer path for dividing torque in a predetermined manner to each pair of driven road wheels;
means associated with the differential to provide a speed differentiation between said driven output members by a predetermined several percent when the road wheels are turning at substantially the same speed; and
clutch means connected between one output member and either the input member or the other output member in a manner permitting said speed differentiation between said driven output members and which is immediately engageable when said differentiation ceases in a manner defining a second torque transfer path for transferring driving torque between the road wheels without imparting shock loading to the vehicle, said clutch means comprising an overrunning clutch including a drive race, a driven race, and a plurality of wedging elements mountable between said races, and a lost motion mechanism drivably connecting said driven race with an output drive shaft in a manner permitting limited angular displacement between said driven race and the output drive shaft.

11. The two axle drive mechanism of claim 10 wherein said lost motion mechanism includes a plurality of radial projections provided on said driven race which are accommodated in circumferentially elongated slots provided on an inner cylindrical surface of said output member.

12. A two axle drive mechanism for a full-time four wheel drive vehicle including front and rear drive axles and which is drivably movable in either forward or reverse directions, comprising:
a center differential defining a first torque transfer path for dividing torque in a predetermined manner to each drive axle and including an input member and a pair of output members driven by said input member, said output members being connectable to front and rear drive axles of the vehicle such that the output member connectable to the front drive axle normally overruns the other output member by a predetermined several percent; and a bidirectional overrunning clutch connected between one output member and either the input member or the other output member in a manner permitting said normal overrun of the first output member in both forward and reverse direction and which is engageable, when said overrun ceases, to establish a second torque transfer path for transferring excess driving torque from the rear to the front drive axle, said clutch including two concentrically disposed races and a series of frictionally influenced wedging elements disposed between said races.

13. The two axle drive mechanism of claim 12 wherein said three members of the differentials are arranged in a planetary gear arrangement including a sun gear element, a ring gear element, and a plurality of planetary gears intermeshing with said sun and ring gear elements and carried by said input member.

14. The two axle drive mechanism of claim 13 wherein said sun gear element is connectable with a first output drive shaft and said ring gear element is connectable to a second output drive shaft.

15. The two axle drive mechanism according to claim 12 wherein said clutch includes a drive race, a driven race, a cage for arranging said wedging elements between said races, and means for exerting a frictional force to said wedging elements.

16. The two axle drive mechanism according to claim 15, including an anti-rattle means for said clutch.

17. The two axle drive mechanism according to claim 16 wherein said anti-rattle means comprises a resiliently biased plunger in said sun gear element frictionally engaging said driven race.

18. The two axle drive mechanism according to claim 15 wherein said drive race comprises an external cam member having a plurality of cam surfaces disposed thereon.

19. The two axle drive mechanism according to claim 18 wherein each cam surface includes at least two ramp sections.

20. The two axle drive mechanism according to claim 15 wherein said driven race includes an internal cylindrical surface engagable with said wedging elements.

21. The two axle drive mechanism according to claim 16 wherein one of said races comprises an external cam member having a plurality of cam surfaces disposed thereabout and the other race being provided with an internal cylindrical surface engagable with said wedging elements.

22. A two axle drive mechanism for a full-time four wheel drive vehicle including front and rear drive axles and which is drivably movable in either forward or reverse directions, comprising:

a center differential defining a first torque transfer path for dividing torque in a predetermined manner to each drive axle and including an input member and a pair of output members driven by said input members, said output members being connectable to front and rear drive axles of the vehicle such that the output member connectable to the front drive axle normally overruns the other output member by a predetermined several percent; said three members of the differential being arranged in a planetary gear arrangement including a sun gear element, a ring gear element, and a plurality of planetary gears intermeshing with said sun and ring gear elements and carried by said input member; and a bidirectional overrunning clutch connected between one output member and either the input member or the other output member in a manner permitting said normal overrun of the first output member in both forward and reverse direction and which is engageable, when said overrun ceases, to establish a second torque transfer path for transferring excess driving torque from the rear to the front drive axle, said clutch including a drive race, a driven race, and a series of wedging elements arranged between said races, and a lost motion mechanism drivingly connecting said driven race with an output drive shaft of the drive mechanism.

23. The two axle drive mechanism according to claim 22 wherein said lost motion mechanism permits limited angular displacement between said driven race and said output drive shaft.

24. The two axle drive mechanism of claim 13 wherein said clutch includes a drive race, a driven race, and a series of roller elements arranged between said races, with the drive race being drivingly engagable with the input member in a manner such that the clutch is responsive to the direction of rotary motion imparted to the mechanism.

25. The two axle drive mechanism of claim 22 wherein said lost motion mechanism includes a plurality of radially extending teeth provided on said driven race and arranged to project into circumferentially extending slots provided on said sun gear element, with said slots having a greater circumferential length than said teeth.

26. A two axle drive mechanism for a full-time four wheel drive vehicle conditionable to move in forward and reverse direction and having front and rear pairs of road wheels, comprising:

operative means for connecting said front and rear pairs of road wheels such that rear wheel slip slightly exceeds front wheel slip in both vehicle directions and during maximum acceleration and weight transfer of the vehicle, said operative means including a center differential defining a first torque transfer path having a predetermined torque split to the front pair of road wheels that is several percent less than the minimum dynamic weight ratio on the front wheels during maximum acceleration and which includes an input member and a pair of output members driven by said input member, said output members being connectable to the pairs of road wheels such that one output member normally overruns the other output member by a predetermined several percent when the front and rear pairs of road wheels are turing at the same speed; and clutch means for connecting one output member and either the input member or the other output member in a manner permitting the normal overrun of said one of said output members in both vehicle directions and which is engagable when said overrun ceases to define a second torque transfer path for transferring excess torque from one pair of wheels to the other before the affected pair of wheels reach their traction limit.

* * * * *